United States Patent
Aaron et al.

(10) Patent No.: US 7,500,999 B2
(45) Date of Patent: Mar. 10, 2009

(54) CATALYTIC REACTOR

(75) Inventors: Timothy Mark Aaron, East Amherst, NY (US); Minish Mahendra Shah, East Amherst, NY (US); Richard John Jibb, Amherst, NY (US)

(73) Assignee: Praxair Technology, Inc., Danbury, CT (US)

( * ) Notice: Subject to any disclaimer, the term of this patent is extended or adjusted under 35 U.S.C. 154(b) by 772 days.

(21) Appl. No.: 10/931,066

(22) Filed: Sep. 1, 2004

(65) Prior Publication Data

US 2006/0045828 A1 Mar. 2, 2006

(51) Int. Cl.
*B01J 10/00* (2006.01)
*B01J 8/00* (2006.01)
*B01J 35/02* (2006.01)
*B01J 7/00* (2006.01)

(52) U.S. Cl. .......................... 48/127.9; 48/61; 422/196; 422/197; 422/211

(58) Field of Classification Search .................. 422/197, 422/211, 192, 196; 48/61, 127.9
See application file for complete search history.

(56) References Cited

U.S. PATENT DOCUMENTS

| | | | | |
|---|---|---|---|---|
| 3,357,916 A | | 12/1967 | Smith | 208/120 |
| 3,976,129 A | * | 8/1976 | Silver | 165/154 |
| 4,737,161 A | | 4/1988 | Szydlowski et al. | 48/61 |
| 5,458,857 A | | 10/1995 | Collins et al. | 422/198 |
| 5,932,181 A | | 8/1999 | Kim et al. | 422/188 |
| 6,254,839 B1 | | 7/2001 | Clawson et al. | 422/190 |
| 2002/0000066 A1 | | 1/2002 | Bentley et al. | |
| 2002/0152681 A1 | | 10/2002 | Oh et al. | 48/127.9 |
| 2002/0172630 A1 | * | 11/2002 | Ahmed et al. | 422/190 |
| 2004/0058230 A1 | | 3/2004 | Hsu | |

FOREIGN PATENT DOCUMENTS

EP 1291319 A2 * 3/2003

OTHER PUBLICATIONS

Machine translation of EP1291319 A2.*
Machine translation of EP1291319 A2, which has a publication date of Mar. 2003.*

* cited by examiner

*Primary Examiner*—Walter D Griffin
*Assistant Examiner*—Natasha Young
(74) *Attorney, Agent, or Firm*—David M. Rosenblum

(57) ABSTRACT

A catalytic reactor is provided with one or more reaction zones each formed of set(s) of reaction tubes containing a catalyst to promote chemical reaction within a feed stream. The reaction tubes are of helical configuration and are arranged in a substantially coaxial relationship to form a coil-like structure. Heat exchangers and steam generators can be formed by similar tube arrangements. In such manner, the reaction zone(s) and hence, the reactor is compact and the pressure drop through components is minimized. The resultant compact form has improved heat transfer characteristics and is far easier to thermally insulate than prior art compact reactor designs. Various chemical reactions are contemplated within such coil-like structures such that as steam methane reforming followed by water-gas shift. The coil-like structures can be housed within annular chambers of a cylindrical housing that also provide flow paths for various heat exchange fluids to heat and cool components.

15 Claims, 4 Drawing Sheets

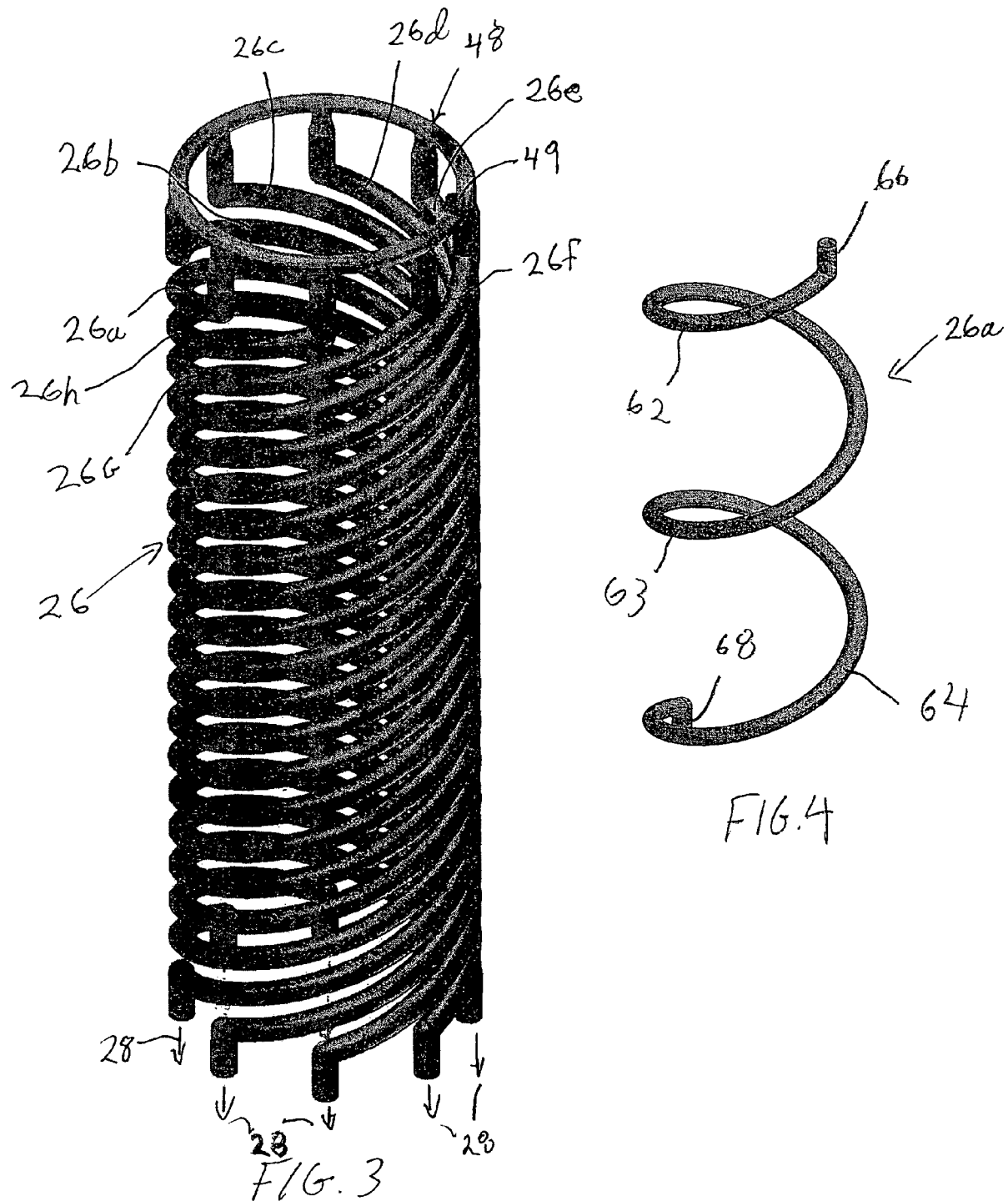

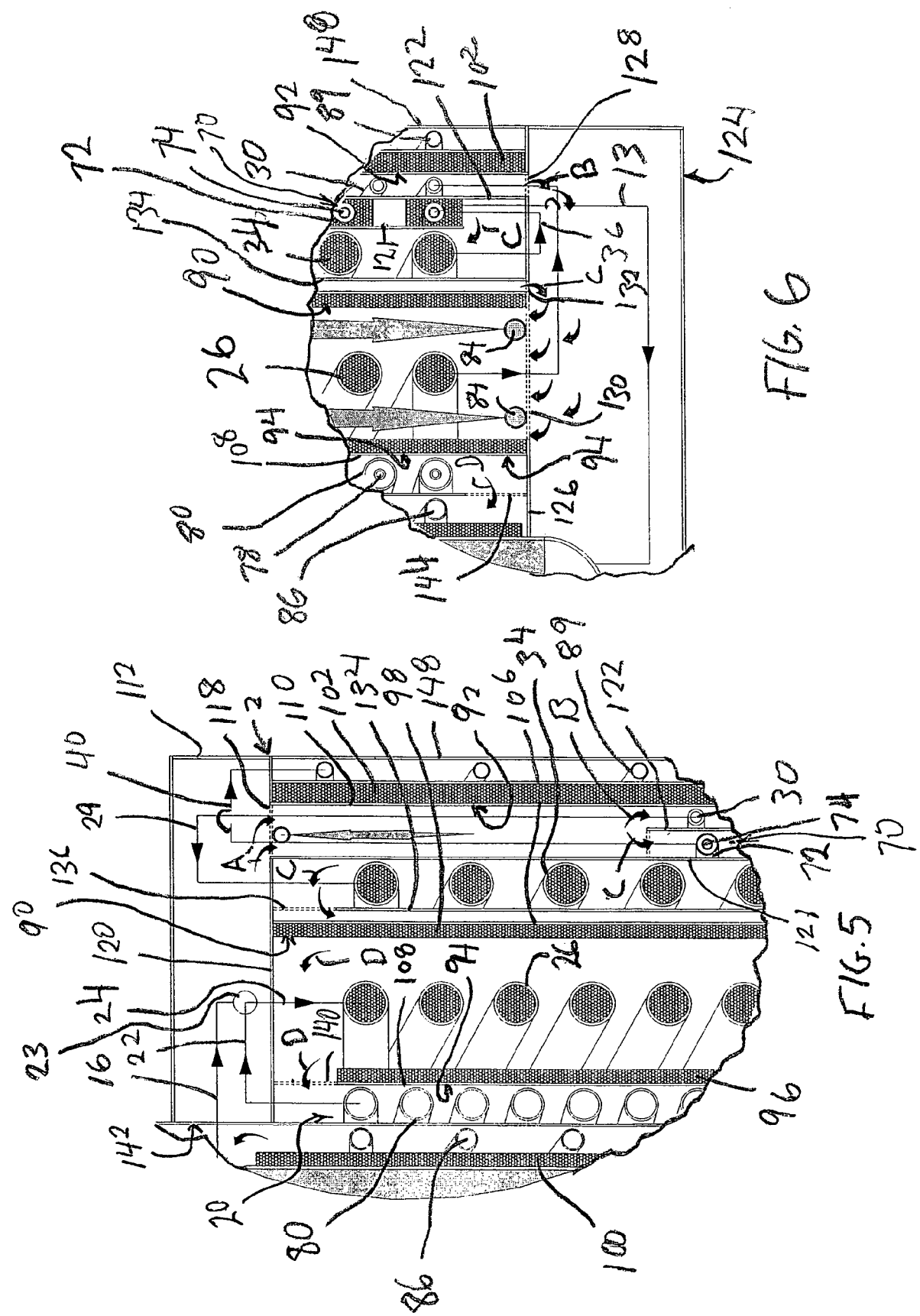

CATALYTIC REACTOR

U.S. GOVERNMENT RIGHTS

This invention was made with United States Government support under Cooperative Agreement number DE-FC36-01GO11004 awarded by the U.S. Department of Energy. The United States Government has certain rights in this invention.

FIELD OF THE INVENTION

The present invention relates to a catalytic reactor having one or more reaction zones containing a catalyst to catalytically react a feed stream and thereby to produce a product stream in which each reaction zone is formed by a plurality of helical reaction tubes in a coaxial arrangement to form a compact coil-like structure. More particularly, the present invention relates to such a catalytic reactor in which the catalytic reaction includes steam methane reforming followed by a water-gas shift reaction to produce a hydrogen rich synthesis gas product stream.

BACKGROUND OF THE INVENTION

Various requirements have arisen for compact chemical reactors to be used in a variety of industrial and commercial settings. For instance, the need is rapidly arising to economically produce small amounts of hydrogen for the potential hydrogen fuel cell economy. For such purposes, it is desirable that hydrogen be produced by known catalytic reactions such as steam methane reforming followed by water-gas shift and that the reactor be as physically small as possible. The requirement that the reactor be compact is necessary to allow such reactor to be situated at existing automotive fuel stations where space is typically at a premium.

In the prior art, a variety of compact catalytic reactor designs have been proposed. For instance, U.S. Pat. No. 4,737,161 discloses a compact hydrogen generator in which a helical tube serving as the reaction zone is situated within a housing having an axial burner. Another similar device is disclosed in U.S. Pat. No. 3,357,916. In this patent a chemical reactor is disclosed. In one embodiment, a reactor shell or housing contains a length of helical tubing to serve as a reaction zone. The helical tube has a catalyst embedded on its inner surface to promote chemical reactions. A hydrocarbon feed can be passed through the helical tubing to be cracked in the presence of the embedded catalyst. Part of the cracked feed can be combusted within the reactor shell to generate heat to support the endothermic cracking reaction.

Other compact reactors utilize a series of concentric shells in which coiled tubes are used for heat exchange. For instance in U.S. Pat. No. 6,254,839 a reformer vessel is provided having a partial oxidation zone that is located beneath the steam reforming zone and that contains a steam reforming catalyst. The two zones are centrally and axially located within the reformer vessel. The partial oxidation zone and the catalytic reaction zone are surrounded by a helical tube and an oxygen containing source stream, or alternatively, fuel and steam, can be introduced into the helical tube to be preheated. Surrounding the helical tube is a shift region containing shift catalyst. A cooling zone, which can be helical tubing, is located within the shift region to receive cooling water to provide lower reaction temperatures that favor the shift reaction.

The reactor designs discussed above provide a compact arrangement for the catalytic reaction of the feed. However, the coiled tube design, while permitting the fabrication of a compact reactor, at the same time, is in and of itself a design limitation on the unit operation or operations to be conducted within the reactor. In this regard, the length of the tube limits the amount of reaction taking place within the reactor. As tube length is increased, the pressure drop within the tube also increases and therefore, energy must be expended at the feed end to overcome such irreversible loss. Additionally, as the spiral is made longer to accommodate a longer length of tubing, even heat transfer and thermal insulation can become problematical because of the greater length over which heat transfer takes place and/or thermal insulation is provided.

As will be discussed, the present invention provides a compact reactor that utilizes a helical tubular type configuration for reaction purposes and preferably, also, for heat transfer purposes but is superior to the prior art discussed above with respect to both its pressure drop and heat exchange characteristics.

SUMMARY OF THE INVENTION

The present invention provides a catalytic reactor to catalytically react a feed stream and thereby produce a product stream. The catalytic reactor is provided with a housing and at least one reaction zone located within the housing. The at least one reaction zone contains a set of reaction tubes to provide parallel flow paths for passage of subsidiary feed streams composed of the feed stream. The reaction tubes contain a catalyst to promote a chemical reaction within the subsidiary feed streams thereby, to produce subsidiary product streams. The reaction tubes are of helical configuration and are positioned, at least substantially, in the coaxial arrangement to form a coil-like structure. At least one reaction feed inlet is provided in communication with the at least one reaction zone to introduce the feed stream into the first reaction zone. Also, at least one product outlet is provided in communication with the at least one reaction zone to discharge the product stream. The at least one product outlet is configured to receive the subsidiary products streams and thereby to discharge the product stream.

Since the coil-like structure is made up of a set of tubes rather than a single tube, a compact reactor can be fabricated in which pressure drop is lower than prior art designs that would otherwise employ a single spiral tube having a length equal to the total length provided by the set of tubes employed in the present invention. Moreover, since a reactor of the present invention is more compact that an equivalent reactor having a single coil, there is less of a length over which heat is transferred and/or insulation is required as compared to compact prior art designs.

The feed stream can be a hydrocarbon and steam containing feed stream and the at least one reaction zone can be a first reaction zone and a second reaction zone having the reaction tubes sized and positioned such that first and second coil-like structures are formed from the reaction tubes of the first reaction zone and the second reaction zone, respectively. In such case, a reforming catalyst is located within the reaction tubes of the first reaction zone to reform said hydrocarbon and steam containing feed stream, thereby to form subsidiary intermediate product streams containing hydrogen and carbon monoxide. A water-gas shift catalyst is located within the reaction tubes of the second reaction zone to increase the hydrogen content in the product stream over that of said subsidiary intermediate product streams. A set of heat exchange tubes communicates between the reaction tubes of the first reaction zone and the second reaction zone to cool the subsidiary intermediate product streams through indirect heat exchange with a cooling fluid thereby to promote temperatures within the second reaction zone that favor hydrogen production via the water-gas shift reaction. The heat exchange tubes are of helical configuration and are positioned, at least substantially, in the coaxial arrangement to form a third coil-like structure. The first coil-like structure, the second coil-like structure and the third coil-like structure are positioned within the housing in a coaxial relationship.

The coaxial arrangement of the first, second and third coil-like structures can be set in a particularly compact structure by providing the housing in the form of a cylinder containing coaxial, annular chambers to contain such structures. The first reaction zone is located in one of the annular chambers and the set of heat exchange tubes and second reaction zone are located in another of the annular chambers, surrounding the one of the annular chambers. In such case, the third coil-like structure surrounds the second coil-like structure. Thermal insulation can be provided to thermally insulate one of the annular chambers and the other of the annular chambers. A heater supplies heat to the first reaction zone to drive the reforming of the feed stream.

The annular chambers are coaxial and preferably comprise first and second annular chambers. The heater is formed of burners firing into the first of the annular chambers and the first reaction zone is located within the first of the annular chambers. The set of heat exchange tubes and the second reaction zone are located in the second of the annular chambers. The first and the second of the annular chambers are in flow communication so that a flow of air as the heat exchange fluid is preheated and is able to pass from the second to the first of the annular chambers to support the combustion of the burners. The housing is provided with an exhaust to discharge the combustion products.

A hydrocarbon feed inlet can be provided to receive a hydrocarbon feed. A tube in tube heat exchanger can be provided that is formed of sets of pairs of inner tubes located within outer tubes. The annular space between the inner tubes and the outer tubes are connected to the second set of reaction tubes to cool the subsidiary product streams against heating the hydrocarbon feed passing through inner tubes. The pairs of inner tubes and the outer tubes are of helical configuration and are positioned, at least substantially, in the coaxial arrangement to form a forth coil-like structure. The forth coil-like structure is located within the second of the annular chambers, between the third coil-like structure formed by the first heat exchange tubes and the second of the coil-like structures formed from the reaction tubes of the second reaction zone.

The tube in tube heat exchanger can be insulated along part of its length and towards the connection of the outer tubes to the reaction tubes of the second reaction zone to increase the heating of the hydrocarbon feed.

At least one feed water inlet is provided to receive boiler feed water. A third annular chamber is provided. Such chamber is surrounded by the first annular chamber and in flow communication with the first annular chamber so as to receive combustion products produced by the burners. A steam generator is connected to the at least one feed water inlet and is formed by a set of boiler feed water tubes of helical configuration. The boiler feed water tubes are positioned, at least substantially, in the coaxial arrangement to form a fifth coil-like structure located within the third annular chamber to receive boiler feed water and thereby generate steam through indirect heat exchange with the combustion products. The inner tubes of tube in tube heat exchanger and the boiler feed water tubes are in communication with the at least one reaction feed inlet to simultaneously introduce the steam and hydrocarbon feed thereto and thereby to form the hydrocarbon and steam containing feed to the first reaction zone.

Preferably, the boiler feed water tubes are provided with inner nested blow down tubes located within and extending along part of the length of the boiler feed water tubes to allow liquid to be expelled, along with dissolved contaminants, thereby to inhibit the contaminants from solidifying and obstructing the flow.

A central axial chamber can be provided. Such chamber is surrounded by the third annular chamber. The central axial chamber, at one end, is in flow communication with the third annular chamber to receive the combustion products after having passed through the fifth coil-like structure of the steam generator and at the other end, is open to form the exhaust of the housing to discharge combustion products. In a preferred embodiment, multiple sets of heat exchange tubes can be utilized. As such the set of heat exchange tubes mentioned above can be a first set of heat exchange tubes. In such embodiment, a second set of heat exchange tubes of helical configuration can be positioned, at least substantially, in the coaxial arrangement to form a sixth coil-like structure located within the central axial chamber. The second set of heat exchange tubes is connected to the burners to preheat fuel to the burners.

Preferably, a sulfur treatment canister can be located within the central axial insulated chamber to reduce the sulfur content within a hydrocarbon feed. As will be discussed, the sulfur treatment canister can be a multiple layered system having a hydrotreatment catalyst and chemisorbent. The sulfur treatment canister is positioned so as to be surrounded by and insulated from the second set of heat exchange tubes. The sulfur treatment canister is interposed between the at least one reaction feed inlet and the inner tubes of the tube in tube heat exchanger such that the hydrocarbon feed is treated by conversion of the sulfur to hydrogen sulfide that is in turn converted into zinc sulfide and water prior to being introduced into the first reaction zone.

The housing can be provided with first and second header chambers bounding opposite ends of the first, second and third of the annular chambers. The first header chamber has an inlet for the flow of air and an annular configuration internally bounded by the central axial chamber. The first header chamber is flow communication with the second of the annular chambers to introduce the flow of air therein. The flow communication between the first and the second of the annular chambers is provided by the second header chamber.

A set of cylindrical air induction baffles can be located within the second annular chamber to form sub-chambers configured to direct the flow of the air such that incoming air is divided into first and second subsidiary air flows. The first subsidiary air flow passes over the first set of heat exchange tubes and the second subsidiary air flow passes over the tube in tube heat exchanger. After having passed over the tube in tube heat exchanger, the second subsidiary air flow reverses direction, to pass over the second set of reaction tubes and then further reverses direction to enter the first annular chamber along with the first subsidiary air flow by passage through the second header chamber.

The first annular chamber can be provided with a first set of openings, at one end, opposite to the burners, for discharge of the combustion products to the third annular chamber. The third annular chamber can be provided with a second set of openings located opposite to the first set of openings for discharge of the combustion products to the central axial chamber for indirect heating of the second set of heat exchange tubes and such that flow of the combustion products in the central axial chamber is in a countercurrent direction to that within the third annular chamber.

A cooler can be provided to cool the synthesis gas product streams. The cooler has a third set of heat exchange tubes of helical configuration positioned, at least substantially, in the coaxial arrangement to form a seventh coil-like structure surrounding the second of the annular chambers and connected between the outer tubes of the fourth coil-like structure and the at least one product outlet. A forth annular chamber surrounds the second annular chamber and contains the third set of heat exchange tubes. The forth annular chamber has an inlet and an outlet to circulate a cooling fluid over the third set of heat exchange tubes to cool the subsidiary synthesis gas product streams prior to passing to the at least one product outlet.

BRIEF DESCRIPTION OF THE DRAWINGS

While the specification concludes with claims distinctly pointing out the subject matter that Applicants regard as their invention, it is believed that the invention will be better understood when taken in connection with the accompanying drawings in which:

FIG. 3 is a perspective view of a coil-like structure of the present invention in which the turns of the structure of formed by a plurality of tubes;

FIG. 4 is a perspective view of a tube used in forming the structure of FIG. 3;

FIG. 5 is a fragmentary view of FIG. 1; and

FIG. 6 is a fragmentary view of FIG. 1.

DETAILED DESCRIPTION

Figure 1:
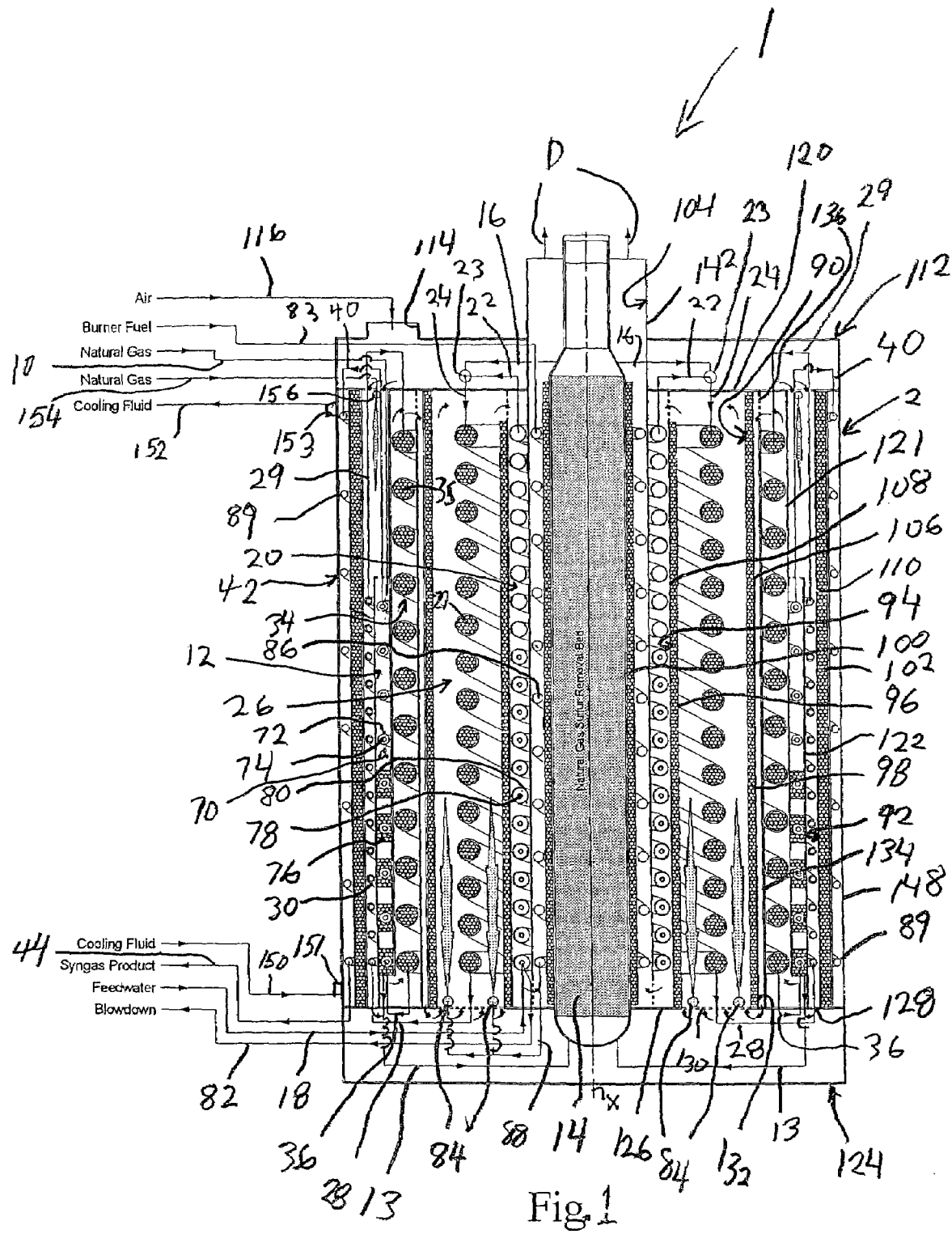
FIG. 1 is a schematic, sectional view of a catalytic reactor of the present invention which is designed to produce a hydrogen rich synthesis gas product.
Figure 2:
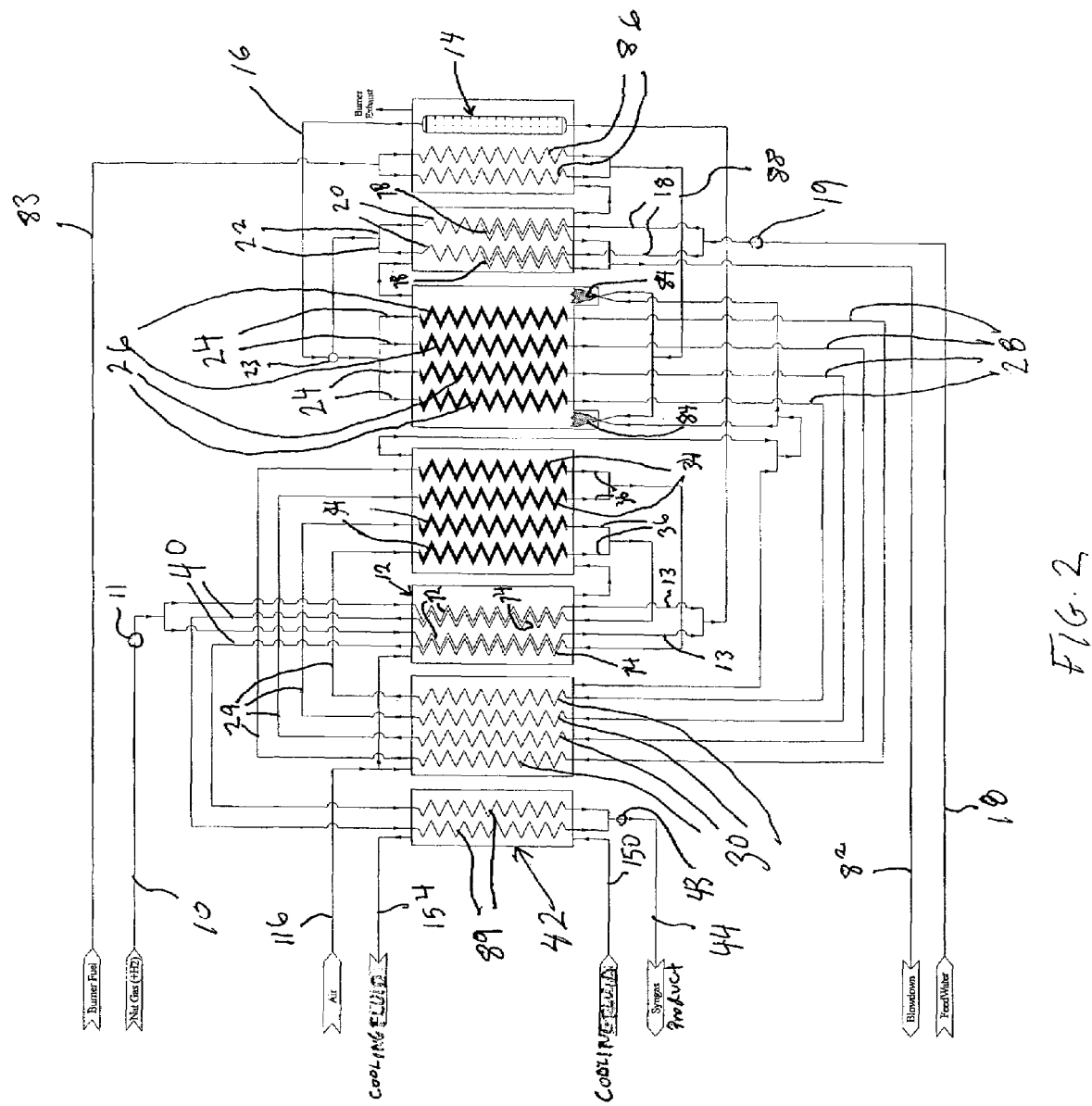
FIG. 2 is a simplified schematic process flow diagram of FIG. 1.

With reference to FIGS. 1 and 2, a catalytic reactor 1 of the present invention is illustrated that is specifically designed to produce a synthesis gas product that has a high concentration of hydrogen. As will be discussed, this is accomplished by steam methane reforming to produce an intermediate product stream which is subsequently subjected to a water-gas shift reaction to produce the synthesis gas product. It is understood that this particular type of catalytic reactor is but one example of an application of the present invention.

As is well known in the art, the steam methane reforming reaction is:

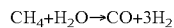
$$CH_4 + H_2O \rightarrow CO + 3H_2$$

The water-gas shift reaction, which allows the conversion of carbon monoxide and water to produce additional hydrogen, is given by the following equation:

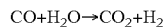
$$CO + H_2O \rightarrow CO_2 + H_2$$

A natural gas stream 10 to be reformed is introduced into a hydrocarbon feed inlet 11 which can be a pipe passing into housing 2 and leading to a manifold to subdivide hydrocarbon gas stream 10 into a series of subsidiary feed streams. Alternatively hydrocarbon feed inlet 11 might be simply a number of inlet pipes. The subsidiary feed streams are heated within a tube in tube heat exchanger 12 which consists of multiple tubes to receive the subsidiary feed streams and thereby to produce heated natural gas streams 13. The heated natural gas streams 13 are introduced into a natural gas sulfur treatment canister 14 to produce a purified natural gas stream 16. Sulfur treatment canister 14 is preferably a known system that contains a hydrotreatment catalyst and a chemisorbent to respectively convert the sulfur to hydrogen sulfide and the resultant hydrogen sulfide to zinc sulfide and water. A typical hydrotreatment catalyst is cobalt molybdenum and a chemisorbent can be zinc oxide. For such purposes, hydrogen, preferable recycled product, is introduced into the natural gas and is contained within natural gas stream 10. The chemisorbent in such a system is periodically replaced.

As will be discussed in more detail, boiler feed water stream 18 is introduced into a boiler feed water inlet 19 which can be series of inlet pipes or inlet pipes and manifold so that boiler feed water stream 18 is introduced into a steam generator that is formed by a set of boiler feed water tubes 20 as a series of subsidiary streams to produce steam streams 22.

The steam streams 22 can be combined into a single steam stream by a manifold and then further combined with purified natural gas stream 16. The resultant combined streams are then introduced into a reaction feed inlet 23, that can be a header tube 48 having an inlet 49, to form a hydrocarbon and steam containing feed stream that is subdivided into subsidiary feed streams 24 by such header tube 48. Subsidiary feed streams 24 are fed to a first reaction zone formed by a first set of reaction tubes 26 that contain a steam methane reforming catalyst 27, typically a nickel based material to promote a steam methane reforming reaction with such subsidiary feed streams 24.

The steam methane reforming occurring within the first set of reaction tubes 26 produces subsidiary intermediate product streams 28 containing hydrogen and carbon monoxide which are fed to a set of first heat exchange tubes 30 to cool the subsidiary intermediate product streams 28 to a temperature that is suitable to promote a water-gas shift reaction within the subsidiary intermediate product streams 28. For instance, subsidiary intermediate product streams 28 have a temperature in a range of about 1500° F. and about 1700° F. Typically, the water-gas shift reaction proceeds in a temperature range of between about 4000° F. and about 800° F.

The resultant partly cooled subsidiary intermediate product streams 29 are fed to a second reaction zone formed by a second set of reaction tubes 34 that contain a water-gas shift catalyst 35 such as a copper or iron based material to promote the water-gas shift reaction within the partly cooled subsidiary intermediate product streams 29 and thereby form subsidiary hot product streams 36 having a higher hydrogen content than that of the subsidiary intermediate product streams 29.

As illustrated, the transfer of the subsidiary intermediate product streams 28 to heat exchange tubes 30 and the partly cooled intermediate product streams 29 to the second set of reaction tubes is on a tube to tube basis. In a proper embodiment, a manifold or the like could be used.

The subsidiary hot product streams 36 are introduced as pairs of streams by a series of manifolds or the like into tube in tube heat exchanger 12 in a counter-current direction to the flow of the incoming streams of natural gas composed of natural gas stream 10 to partly cool subsidiary hot product streams 36. The resultant partly cooled subsidiary product streams 40 are fed to a cooler 42 (described in more detail hereinafter) connected to a product outlet 43 which can be a manifold or like structure and discharged as a hydrogen-containing, synthesis gas product stream 44.

With additional reference to FIG. 3, the first set of reaction tubes 26 are each of helical configuration and are positioned, at least substantially, in a coaxial arrangement to form a first coil-like structure. The first set of reaction tubes 26, individually designated by reference numerals 26a, 26b, 26c, 26d,

26*e*, 26*f*, 26*g* and 26*h*, provide parallel flow paths for natural gas stream 10 or other hydrocarbon containing gas. Reaction tubes 26 are fed by a header pipe 48 having an inlet 49 and produce subsidiary intermediate product streams 28. In this regard, as mentioned herein and in the claims that the reaction tubes 26*a*, 26*b*, 26*c*, 26*d*, 26*e*, 26*f*, 26*g* and 26*h* are "at least substantially" in a coaxial arrangement. Such term is used in that the axis of each of the reaction tubes 26*a*, 26*b*, 26*c*, 26*d*, 26*e*, 26*f*, 26*g* and 26*h* can vary slightly while still forming the first coil-like structure. However, for the most compact structure, the reaction tubes 26*a*, 26*b*, 26*c*, 26*d*, 26*e*, 26*f*, 26*g* and 26*h* are in a coaxial arrangement about a common axis, for instance, axis "X" shown in FIG. 1. Moreover, while the diameter of the turns of each of reaction tubes 26*a*, 26*b*, 26*c*, 26*d*, 26*e*, 26*f*, 26*g* and 26*h* are preferably equal, variations in the diameter are, however, possible in accordance with the present invention. Additionally, variations in the diameter of each of the reaction tubes 26*a*, 26*b*, 26*c*, 26*d*, 26*e*, 26*f*, 26*g* and 26*h* are also possible.

With additional reference to FIG. 4, one such reaction tube 26*a* is illustrated having turns 62, 63 and 64, an inlet 66 to receive one of the subsidiary feed streams 24 to be reacted within reaction tube 26*a* and an outlet 68 to discharge one of the subsidiary intermediate product streams 28 produced within the illustrated reaction tube 26*a*.

The second reaction zone is formed in a similar manner to the first reaction zone and as such, the second set of reaction tubes 34 thereof are each of helical configuration and arranged, at least substantially, in a coaxial relationship to form a second coil-like structure surrounding the first coil-like structure of the first set of reaction tubes 26.

The first set of heat exchange tubes 30 are again, each of helical configuration and in the manner described above for reaction tubes 26, form a third coil-like structure surrounding the second coil-like structure of the second set of reaction tubes 34.

As illustrated, the first set of reaction tubes 26 contain eight tubes and as mentioned above, the connection between the first set of reaction tubes 26, the first set of heat exchange tubes 30 and the second set of reaction tubes 34 is on a tube to tube basis. As such there are also eight tubes forming the second set of reaction tubes 34 and the first set of heat exchange tubes 30. The number of tubes can, however, vary depending upon the size of the particular reactor. In this regard, preferably the tubes in each of such sets number anywhere from two to twenty tubes. As will be discussed, further components of catalytic reactor 1 are similarly designed. It is such coil-like structures that allow for the compact and low-pressure drop characteristics of such components and therefore catalytic reactor 1.

It is possible to form any catalytic reactor in the manner of the first set of reaction tubes 26. For instance, a catalytic reactor could be formed in such manner with a catalyst to promote a catalytic partial oxidation reaction to produce a synthesis gas product stream. In such case only a single reaction zone would be employed.

As has been discussed with respect to the first set of reaction tubes 26 and the general description of catalytic reactor 1, the reaction feed inlet to the reaction zone thus formed can be a manifold-type structure in the form of a header pipe 48 to distribute the feed stream, as subsidiary streams, to the reaction tubes 26. The product outlet could similarly be formed of such a manifold-type structure. Other possibilities include chambers connected at opposite ends to the tubes having a reaction inlet to receive the feed and a product outlet to discharge the product. The feed could be separately fed through a set of inlets and outlets that were each associated with only a portion of the tubes. Any reaction feed inlet and/or product outlet could be located either within a housing for the reaction zone(s) or located outside of the housing to introduce feed to the reaction zone and to discharge product therefrom. If the hydrocarbon stream were pre-mixed, a catalytic reactor in accordance with the present invention would only be proved with such a reaction feed inlet and a product outlet.

Furthermore, the connection between components, such as reaction zones, can be effected by a direct tube-to-tube connection or can be accomplished by intermediate manifold-like structures to collect streams from one component and to redistribute such streams to another component. All of such possibilities are all meant to be covered in the appended claims.

Tube in tube heat exchanger 12 is given the same configuration as reaction tubes 26 forming the first reaction zone, namely, it is formed of a coaxial arrangement of tube-like passes 70 to form a forth coil-like structure. Such forth coil-like structure is coaxial with and inserted between the second coil-like structure of the second set of reaction tubes 34 and the third coil-like structure of the first set of heat exchange tubes 30.

Each of the tube-like passes 70 of tube in tube heat exchanger 12 is formed of an outer tube 72 and an inner tube 74. Natural gas stream 10 is fed as subsidiary natural gas streams into the inner tubes 74 to be heated through indirect heat exchange with subsidiary hot product streams 36 being introduced into the annular space between inner tubes 74 and outer tubes 72. Each of the tube-like passes 70 of tube in tube heat exchanger 12 are insulated partly along the height of the resultant forth coil-like structure by insulation 76. This causes heat to be retained and less heat transfer to the air and therefore increased heating to occur in that portion of tube in tube heat exchanger 12 that is insulated than the upper uninsulated portion. As a result, the subsidiary natural gas feed streams formed from natural gas feed stream 10 recover additional heat from the hot product stream 36. This also reduces the temperature of the cooling fluid on the outside of the tube in tube heat exchanger allowing this fluid to provide greater cooling effect to the second reaction zone.

A steam generator is formed by boiler feed water tubes 20. Each of the boiler feed water tubes 20 are of helical configuration and are arranged in the same manner as described with respect to the first set of reactor tubes 26 of the first reaction zone to form a fifth coil-like structure surrounded by the first coil-like structure of the first reaction zone.

Boiler feed water tubes 20 have, along part of their length, inner nested tubes 78 provided within outer tubes 80. As the boiler feed water rises within the annular spaces between outer tubes 80 and inner nested tubes 78 water vaporizes to form a two-phase, liquid-vapor stream. The more volatile contaminants contained within boiler feed water stream 18 tend to plate out and plug the boiler feed water tubes 20. In order to prevent this, water containing dissolved contaminants will enter inner tubes 78 which serve as blow down tubes to discharge such water from inner tubes 78 as a blow-down stream 82. This removes the non-volatile contaminants from the steam.

It is to be noted that such a steam generator could be used with any type of reactor requiring steam. For instance, a steam generator formed of such boiler feed water tubes could be contained in a housing for passage of a heated fluid to raise steam in such boiler feed water tubes.

Steam methane reforming is an endothermic reaction requiring heat. This heat is provided by an arrangement of burners 84, having pairs of burners firing on the inside and outside of the first coil-like structure provided by reaction tubes 26. In the present invention, approximately two ring-type burners are used. Burners 84 fire into the first coil-like structure in order to sustain the reaction. A burner fuel stream 83, again preferably natural gas and/or other fuel gases that may be available and as subsidiary streams, is introduced within a second set of heat exchange tubes 86. Each of the second set of heat exchange tubes 86 are of helical configuration and are coaxially arranged to form a sixth coil-like structure located between the sulfur treatment canister 14 and the fifth coil-like structure provided by the boiler feed water tubes 20. The burner fuel stream 83 is heated within such sixth coil-like structure to form heated fuel streams 88 which are introduced into burners 84.

Cooler 42 is provided with a third set of heat exchange tubes 89 which are each of helical configuration and are coaxially arranged to form a seventh coil-like structure to fully cool the partly cooled subsidiary synthesis gas product streams 40 and thereby to produce the syngas product stream 44. As illustrated, such seventh coil-like structure surrounds the first set of heat exchange tubes 30. It is to be noted that the term "fully cooled" means the temperature at which the product is to be removed and/or further processed such as by purification. This temperature can be about 20° F. above ambient. Such syngas product stream 44 contains hydrogen, water vapor and liquid, carbon monoxide, carbon dioxide, nitrogen and methane. Preferably, it should have a dry hydrogen content of between about 60% and about 85%. It is to be noted that the hot intermediate product streams 28 have a dry hydrogen content of about 25%.

The aforementioned network of tubing is retained within a cylindrical housing 2 having a first annular chamber 90, a second annular chamber 92 and a third annular chamber 94. First, second and third annular chambers 90, 92 and 94 are insulated by cylindrical arrangements of insulation 96, 98, 100 and 102. In this regard, the insulation provided in first and second annular chambers 90 and 92 permit the heating of the first reaction zone provided by the first set of reaction tubes 26 by burners 84 and the simultaneous cooling of the intermediate product streams 28 within the first set of heat exchange tubes 30 and the maintenance of lower operating temperatures in the second reaction zone provided by the second set of reaction tubes 34. Additionally, a central axial chamber 104 is provided to retain natural gas sulfur treatment canister 14 and the second set of heat exchange tubes 86. Insulation 96 and 100 allow heat to be retained for the heat transfer between the combustion products and the boiler feed water and the burner fuel within boiler feed water tubes 20 and the second set of heat exchange tubes 86, respectively. As may be appreciated, such insulation might be deleted. However, there would be a loss of thermal efficiency and production.

First annular chamber 90 is formed between cylindrical chamber sidewalls 106 and 108. Second annular chamber 92 is formed between cylindrical chamber side walls 106 and 110. Central axial chamber 104 is a tube open at the top to provide an exhaust for combustion products. The chambers are insulated to allow the intermediate product stream produced within the first set of reformer tubes 26 to be cooled within heat exchange tubes 30 without being heated by burners 84.

Housing 2 is provided with a first header chamber 112 having an air inlet 114 for inlet of an air stream 116 that serves as a cooling fluid within second annular chamber 92. Header chamber 112 is of annular configuration and is bounded on the inside by central axial chamber 104. With additional reference to FIG. 5, the air flow, designated by reference "A", provided by air stream 116 enters second annular chamber 92 through openings 118 provided in a base wall 120 of first header chamber 112. Air flow "A" is initially directed toward tube in tube heat exchanger 12 and the first set of heat exchange tubes 30 by way of a cylindrical baffle plate 121 which subdivides the second annular chamber 92 into a sub chamber. A further cylindrical baffle plate 122 further divides the air flow into first and second subsidiary air flows "B" and "C". The first subsidiary air flow "B" passes over the first set of heat exchange tubes 30. The second subsidiary air flow "C" passes over tube in tube heat exchanger 12.

With further reference to FIG. 6, the bottom of housing 2 is bounded by a second header chamber 124 having a base wall 126 that is provided with openings 128, 130 and 132. First subsidiary air flow "B" passes into second header chamber 124 through openings 128 and then into first annular chamber 90 by way of openings 130 to support combustion within burners 84. The second subsidiary air flow "C" passes beneath cylindrical baffle plate 121 and reverses in direction to pass over the second set of reaction tubes 34. This provides active cooling for the second set of reaction tubes 34 to allow for a further increase in hydrogen production.

With additional reference again to FIG. 5, the second set of reaction tubes 34 are bounded on the inside by a cylindrical baffle plate 134 further subdividing second annular chamber 92 into a farther sub chamber. Cylindrical baffle plate 134 has openings 136 at the top thereof to allow the second subsidiary air flow "C" to reverse direction again and passes between the cylindrical wall 106 bounding second annular chamber 92 and cylindrical baffle plate 134. The flow of air in such sub chamber in and of itself serves as insulation to second annular chamber 92. The air flow then passes out of openings 132 provided in base wall 126 of second header chamber 124 to pass into first annular chamber 90 and support combustion of burners 84.

The cylindrical chamber wall 108 bounding the third annular chamber 94 is provided with openings 140 to allow a flow "D" of the combustion products to enter third annular chamber 94. A cylindrical chamber wall 142 forming the central axial chamber 104 and bounding the third annular chamber 94 directs the flow of combustion gases through the boiler feed water tubes 20. Openings 144 located within the bottom of cylindrical baffle plate 142 cause the combustion products to reverse direction and then pass over the second set of heat exchange tubes 86 and into an exhaust provided by an open end of central axial chamber 104.

Cooler 42 is formed in housing 2 within an outer cylindrical wall 148 that encloses the third set of heat exchange tubes 89 between outer cylindrical wall 148 and cylindrical chamber wall 102. A cooling fluid stream 150, for instance a water glycol mixture, is introduced into an inlet 151 of the cooler 42 and is discharged as a heated cooling fluid stream 152 from an outlet 153 after passing through the third set of heat exchange tubes 89.

For starting purposes, a burner fuel stream 154 can be introduced to burners 156 firing into the second annular chamber 92 at openings 118 within base wall 120 of first header chamber 112. Burners 156 are in the form of segmented arc-like burners. Burners 156 can be activated at start-up to bring the components of catalytic reactor up to operating temperature.

As is apparent from the above discussion all flows used for heat exchange within catalytic reactor 1 are countercurrent. For instance, the flow of air provided by air stream 116 flows through the first set of heat exchange tubes 30 and tube in tube heat exchanger 12 in one direction (from the top to the bottom in the illustration) and the flow inside the tubes of exchangers 30 and 12, flows in the opposite direction (i.e. from the bottom to the top in the illustration). Although thermal efficiency would be lost, all or some of such flows could be co-current, that is, in the same direction.

As may be appreciated by those skilled in the art, there are many variations possible with respect to a catalytic reactor in accordance with the present invention that is designed to conduct both reforming and shift reactions with intermediate cooling. For instance, a reactor could be constructed with the first and second reaction zone formed of first and second sets of reaction tubes 26 and 34 and a first set of heat exchange tubes 30. In such embodiment, sulfur removal might be conducted outside the housing 2. Furthermore, there are potential industrial applications in which steam and heated natural gas are available from processes being concurrently conducted with the reforming reactions and the same could be introduced into an appropriate inlet designed to distribute subsidiary hydrocarbon and steam containing feed streams to the first reaction zone formed of the first set of reaction tubes 26. If such heated natural gas source were unavailable, a separate external heater could be provided. In such embodiment, the housing could be provided with two annular chambers. The resultant hot product could be used in a subsequent process or could be separately cooled as required.

In any embodiment of the present invention, the first set of heat exchange tubes 30 might be positioned in line with the second set of reaction tubes 34. This would not be preferred in that the degree of compactness provided by the illustrated embodiment would be lost. Another possible variation is to combine functions within single coil-like structures. For instance, it is possible to incorporate the interstage cooling provided by the second set of reaction tubes 30 within the second set of reaction tubes by only partly filling the section set of reaction tubes 30 with catalyst. In further potential embodiments, some of the coiled heat exchange components could be replaced with multiple pass heat exchangers or single coils depending upon the required heat transfer duty.

While the present invention has been described with reference to a preferred embodiment, as will occur to those skilled in the art, numerous changes, additions and omissions may be made without departing from the spirit and scope of the present invention.

What is claimed is:

1. A catalytic reactor to catalytically react a feed stream and thereby produce a product stream, said catalytic reactor comprising:
   a housing;
   at least one reaction zone;
   the at least one reaction zone located within the housing and having a set of separate reaction tubes to provide parallel flow paths for subsidiary feed streams composed of the feed stream, the reaction tubes containing a catalyst to promote a chemical reaction within the subsidiary feed streams thereby, to produce the product stream from subsidiary product streams formed within the reaction tubes;
   the set of separate reaction tubes being of helical configuration and positioned, at least substantially, in the coaxial arrangement to form a coil-like structure;
   at least one reaction feed inlet in communication with the at least one reaction zone to introduce the feed stream into the at least one reaction zone and configured so that the feed stream flows within the set of separate reaction tubes as the subsidiary feed streams; and
   at least one product outlet in communication with the at least one reaction zone and configured so as to receive the subsidiary product streams and thereby to discharge the product stream.

2. The catalytic reactor of claim 1, wherein:
   said feed stream is a hydrocarbon and steam containing feed stream;
   said at least one reaction zone is a first reaction zone and a second reaction zone having reaction tubes sized and positioned such that the coil-like structure of the first reaction zone is a first coil-like structure and the coil like structure of the second reaction zone is a second coil-like structure;
   the catalyst is a reforming catalyst located within the first reaction zone to promote reforming of said hydrocarbon and steam containing feed stream, thereby to form subsidiary intermediate product streams containing hydrogen and carbon monoxide and a water-gas shift catalyst located within the second reaction zone to increase the hydrogen content in the product stream over that of said intermediate product stream;
   a set of heat exchange tubes communicates between the reaction tubes of the first reaction zone and the second reaction zone to cool the subsidiary intermediate product streams through indirect heat exchange with a cooling fluid thereby to promote temperatures within the second reaction zone that favor hydrogen production via the water-gas shift reaction;
   the heat exchange tubes are of helical configuration and are positioned, at least substantially, in the coaxial arrangement to form a third coil-like structure; and
   the first coil-like structure, the second coil-like structure and the third coil-like structure positioned within the housing in a coaxial relationship.

3. The catalytic reactor of claim 2, wherein:
   the housing is cylindrical and has coaxial, annular chambers;
   the first reaction zone is located in one of the annular chambers;
   the set of heat exchange tubes and second reaction zone are located in another of the annular chambers, surrounding the one of the annular chambers and with the third coil-like structure surrounding the second coil-like structure;
   thermal insulation thermally insulates the one of the annular chambers and the another of the annular chambers; and
   a heater supplies heat to the first reaction zone to drive the reforming of the feed stream.

4. The catalytic reactor of claim 3, wherein:
   the coaxial annular chambers comprise first and second annular chambers;
   the heater is formed of burners firing into the first of the annular chambers;
   the first reaction zone is located within the first of the annular chambers;
   the set of heat exchange tubes and the second reaction zone are located in the second of the annular chambers
   the first and the second of the annular chambers are in flow communication so that a flow of air as the heat exchange fluid is preheated and is able to pass from the second to the first of the annular chambers to support combustion, thereby to produce combustion products; and
   the housing has an exhaust to discharge the combustion products.

5. The catalytic reactor of claim 4, further comprising:
   a hydrocarbon feed inlet to receive a hydrocarbon feed;
   a tube in tube heat exchanger formed of sets of pairs of inner tubes located within outer tubes, the outer tubes connected to the second set of reaction tubes to cool the subsidiary product streams and the inner tubes connected to the hydrocarbon feed inlet to heat the hydrocarbon feed against the cooling of the subsidiary product streams;

the pairs of inner tubes and the outer tubes being of helical configuration and positioned, at least substantially, in the coaxial arrangement to form a fourth coil-like structure located within the second of the annular chambers, between the third coil-like structure formed by the first heat exchange tubes and the second of the coil-like structures formed from the reaction tubes of the second reaction zone;

a third annular chamber surrounded by the first annular chamber and in flow communication with the first annular chamber so as to receive combustion products produced by the burners;

at least one feed water inlet to receive boiler feed water; and a steam generator connected to the at least one feed water inlet and formed of a set of boiler feed water tubes of helical configuration and positioned, at least substantially, in the coaxial arrangement to form a fifth coil-like structure located within the third annular chamber to receive the boiler feed water and thereby generate steam through indirect heat exchange with the combustion products; and the inner tubes of the tube in tube heat exchanger and the boiler feed water tubes being in communication with the at least one reaction feed inlet to simultaneously introduce the steam and hydrocarbon feed thereto and thereby form the hydrocarbon and steam containing feed to the first reaction zone.

6. The catalytic reactor of claim 5, further comprising inner nested blow down tubes located within and extending along part of the length of the boiler feed water tubes to allow liquid to be expelled, along with dissolved contaminants, thereby to inhibit the contaminants from solidifying and obstructing the flow.

7. The catalytic reactor of claim 5, wherein the tube in tube heat exchanger is insulated along part of its length and towards the connection of the outer tubes to the reaction tubes of the second reaction zone to increase the heating of the hydrocarbon feed.

8. The catalytic reactor of claim 5, further comprising:

a central axial chamber surrounded by the third annular chamber, the central axial chamber, at one end, in flow communication with the third annular chamber to receive the combustion products after having passed through the fifth coil-like structure of the steam generator and at the other end, open to form the exhaust;

the set of heat exchange tubes being a first set of heat exchange tubes; and a second set of heat exchange tubes of helical configuration positioned, at least substantially, in the coaxial arrangement to form a sixth coil-like structure located within the central axial chamber; and the second set of heat exchange tubes being connected to the burners to preheat fuel to the burners.

9. The catalytic reactor of claim 8, further comprising:

a sulfur treatment canister located within the central axial chamber, surrounded by and insulated from the second set of heat exchange tubes, to reduce sulfur content within a hydrocarbon feed;

the sulfur treatment canister being interposed between the at least one reaction feed inlet and the inner tubes of the tube in tube heat exchanger such that the hydrocarbon feed is treated prior to being introduced into the first reaction zone.

10. The catalytic reactor of claim 9, further comprising:

the housing having first and second header chambers bounding opposite ends of the first, second and third of the annular chambers;

the first header chamber having an inlet for the flow of air and an annular configuration internally bounded by the central axial chamber, the first header chamber being in flow communication with the second of the annular chambers to introduce the flow of air therein; and the flow communication between the first and the second of the annular chambers being provided by the second header chamber.

11. The catalytic reactor of claim 10, further comprising a set of cylindrical air induction baffles located within the second annular chamber and forming sub-chambers configured to direct the flow of the air such that incoming air is divided into first and second subsidiary air flows, the first subsidiary air flow passes over the first set of heat exchange tubes and the second subsidiary air flow passes over the tube in tube heat exchanger, reverses direction to pass over the second set of reaction tubes and then, further reverses direction to enter the first annular chamber along with the first subsidiary air flow by passage through the second header chamber.

12. The catalytic reactor of claim 11, wherein: said first annular chamber has a first set of openings, at one end, opposite to the burners for discharge of the combustion products to the third annular chamber and the third annular chamber has a second set of openings located opposite to the first set of openings for discharge of the combustion products to the central axial chamber for indirect heating of the second set of heat exchange tubes and such that flow of the combustion products in the central axial chamber is in a countercurrent direction to that within the third annular chamber.

13. The catalytic reactor of claim 8 or claim 11, further comprising:

a cooler to cool the subsidiary synthesis gas product streams, the cooler comprising:

a third set of heat exchange tubes of helical configuration positioned, at least substantially, in the coaxial arrangement to form a seventh coil-like structure surrounding the second of the annular chambers and connected between the outer tubes of the tube in tube heat exchanger and the at least one product outlet to further cool the subsidiary synthesis gas product streams; and a forth annular chamber surrounding the second annular chamber and containing the third set of heat exchange tubes;

the forth annular chamber having an inlet and an outlet to circulate a cooling fluid past the forth set of heat exchange tubes to cool the subsidiary synthesis gas product streams prior to passing to the at least one product outlet.

14. The catalytic reactor of claim 13, further comprising inner nested blow down tubes located within and extending along part of the length of the boiler feed water tubes to allow liquid to be expelled, along with dissolved contaminants, thereby to inhibit the contaminants from solidifying and obstructing the flow.

15. The catalytic reactor of claim 14, wherein the tube in tube heat exchanger is insulated along part of its length and towards the connection of the inner tubes to the reaction tubes of the second reaction zone to increase the heating of the hydrocarbon feed.

* * * * *

UNITED STATES PATENT AND TRADEMARK OFFICE
CERTIFICATE OF CORRECTION

| | | |
|---|---|---|
| PATENT NO. | : 7,500,999 B2 | Page 1 of 1 |
| APPLICATION NO. | : 10/931066 | |
| DATED | : March 10, 2009 | |
| INVENTOR(S) | : Aaron et al. | |

It is certified that error appears in the above-identified patent and that said Letters Patent is hereby corrected as shown below:

Please replace the two occurrences of the word "forth" in col. 3, line 42 with --fourth--.

Please replace the word "forth" in col. 5, line 9 with --fourth--.

Please replace the word "forth" in col. 5, line 11 with --fourth--.

Please replace the word "forth" in col. 8, line 18 with --fourth--.

Please replace the word "forth" in col. 8, line 31 with --fourth--.

Please replace the word "forth" in col. 14, line 45 with --fourth--.

Please replace the word "forth" in col. 14, line 48 with --fourth--.

Please replace the word "forth" in col. 14, line 49 with --fourth--.

Signed and Sealed this

Twenty-third Day of June, 2009

JOHN DOLL
*Acting Director of the United States Patent and Trademark Office*